United States Patent [19]

Brink, Jr. et al.

[11] 3,876,792
[45] Apr. 8, 1975

[54] SLIME CONTROL COMPOSITIONS CONTAINING PHENOLIC COMPOUNDS AND THEIR USE

[75] Inventors: Robert H. Brink, Jr., Doylestown; Bernard F. Shema, Glenside; Roger L. Justice, Cornwells Heights; Paul Swered, Philadelphia, all of Pa.

[73] Assignee: Betz Laboratories, Inc., Trevose, Pa.

[22] Filed: Apr. 4, 1974

[21] Appl. No.: 457,742

Related U.S. Application Data

[62] Division of Ser. No. 160,191, July 6, 1971, Pat. No. 3,829,305.

[52] U.S. Cl. .................. 424/277; 71/67; 162/190; 424/346
[51] Int. Cl. ............................................. A01n 9/02
[58] Field of Search ................ 71/67; 424/277, 346

[56] References Cited
UNITED STATES PATENTS

| | | | |
|---|---|---|---|
| 2,997,380 | 8/1961 | Josephs | 71/66 |
| 3,031,372 | 4/1962 | Brock | 424/277 |
| 3,824,318 | 7/1974 | Shema et al. | 71/67 |
| 3,829,305 | 8/1974 | Brink, Jr. et al. | 71/67 |

*Primary Examiner*—James O. Thomas, Jr.
*Attorney, Agent, or Firm*—Alexander D. Ricci

[57] ABSTRACT

The present invention relates to certain processes and compositions useful for inhibiting and/or controlling the growth of slime in water and, in particular, water employed for industrial purposes. Water employed in the manufacture of pulp paper and water employed in cooling water systems, as well as other industrial waters, provide environments which are conducive to slime formation. The novel compositions of the present invention are mixtures which show unexpected synergistic activity against microorganisms, including bacteria, fungi and algae, which produce slime in aqueous systems. The slime, of course, is objectionable from an operational and/or an aesthetic point of view. Specifically, the invention is directed to and the use of compositions comprising a combination of 5-chloro-4-phenyl-1,2-dithiole-3-one and phenolic compounds (or mixtures thereof). The inventive compositions inhibit the growth of slime in water, or more specifically, possess biocidal activity against bacteria, fungi and/or algae. The phenolic compounds contemplated for use in accordance with the present invention are those phenolic compounds which possess the capacity to kill or inhibit the growth of slime-forming microorganisms such as bacteria, fungi and algae. The type phenolic compounds encompassed by the present invention may be exemplified by: phenol, ortho-phenylphenol, 2, 3, 4, 6-tetrachlorophenol, 4-chloro-2-cyclopentylphenol and 2-chloro-4-phenylphenol.

5 Claims, No Drawings

SLIME CONTROL COMPOSITIONS CONTAINING PHENOLIC COMPOUNDS AND THEIR USE

This is a continuation, division, of application Ser. No. 160,191, filed July 6, 1971 now U.S. Pat. No. 3,829,305.

BACKGROUND OF THE INVENTION

The formation of slime by microorganisms is a problem which attends many systems. For example, lagoons, lakes, ponds, pools and such systems as cooling water systems and pulp and paper mill systems all possess conditions which are conducive to the growth and reproduction of slime-forming microorganisms. In both once-through and recirculating cooling systems, for example, which employ large quantities of water as a cooling medium, the formation of slime by microorganisms is an extensive and constant problem.

Airborne organisms are readily entrained in the water from cooling towers and find this warm medium an ideal environment for growth and multiplication. Aerobic and heliotropic organisms flourish on the tower proper while other organisms colonize and grow in such areas as the tower sump and the piping and passages of the cooling system. Such slime serves to deteriorate the tower structure in the case of wooden towers. In addition, the deposition of slime on metal surfaces promotes corrosion. Furthermore, slime carried through the cooling system plugs and fouls lines, valves, strainers, etc. and deposits on heat exchange surfaces. In the latter case, the impedance of heat transfer can greatly reduce the efficiency of the cooling system.

In pulp and paper mill systems, slime formed by microorganisms is also frequently and, in fact, commonly encountered. Fouling or plugging by slime also occurs in the case of pulp and paper mill systems. Of greater significance, the slime becomes entrained in the paper produced to cause breakouts on the paper machines with consequent work stoppages and the loss of production time or unsightly blemishes in the final product; this, of course, results in rejects and wasted output. The previously discussed problems have resulted in the extensive utilization of biocides in cooling water and pulp and paper mill systems. Materials which have enjoyed widespread use in such applications include chlorine, organo-mercurials, chlorinated phenols, organo-bromines, and various organo-sulfur compounds. All of these compounds are generally useful for this purpose but each is attended by a variety of impediments. For example, chlorination is limited both by its specific toxicity for slime-forming organisms at economic levels and by the ability of chlorine to react which results in the expenditure of the chlorine before its full biocidal function may be achieved. Other biocides are attended by high costs, odor problems and hazards in respect to storage, use or handling which limit their utility. To date, no one compound or type of compound has achieved a clearly established predominance in respect to the applications discussed. Likewise, lagoons, ponds, lakes and even pools, either used for pleasure purposes or used for industrial purposes for the disposal and storage of industrial wastes become, during the warm weather, besieged by slime due to microoraganism growth and reproduction. In the case of the recreational areas, the problem of infection, odor, etc. is obvious. In the case of industrial storage or disposal of industrial materials, the microorganisms cause additional problems which must be eliminated prior to the materials' use or the waste is treated for disposal.

It is the object of the present invention to provide compositions for controlling slime-forming microorganisms in aqueous systems, such as cooling water systems and pulp and paper mill systems, and for controlling slime formation or microorganism populations in aqueous bodies in general. Moreover, another object of the invention is the provision of methods for preserving materials and for controlling slime-forming microorganisms in any aqueous system which is conducive to the growth and reproduction of microorganisms and, in particular, cooling water and paper and pulp mill systems. These methods employ a combination of 5-chloro-4-phenyl-1,2-dithiole-3-one and a phenolic compound (or mixtures thereof). The phenolic compound must possess the property of being biocidally active against bacteria, fungi and/or algae, i.e., either kill or inhibit the growth of these microorganisms.

In the practice of the invention, the combination is added to the particular material to be preserved or to the system being treated, for example cooling water sytems, paper and pulp mill systems, pools, ponds, lagoons, lakes, etc., in a quantity adequate to control the slime-forming microorganisms which are contained by, or which may become entrained in, the system which is treated. It has been found that such compositions and methods control the growth and occurrence of such microorganisms as may populate these particular systems.

GENERAL DESCRIPTION OF THE INVENTION

As earlier stated, the inventive compositions comprise a combination of 5-chloro-4-phenyl-1,2-dithiole-3-one and a particular phenolic compound (or mixtures thereof) with either compound being present in such a quantity as to impart a synergistic behavior for the purpose to the composition as a whole. Preferably, the compositions contain a percentage by weight ranging from about 5 to about 95 percent of the dithiole-3-one compound and from about 5 to about 95 percent of the phenolic compound. When these two ingredients are mixed either beforehand or by addition to the aqueous system individually, the resulting mixtures possess a high degree of slimicidal activity which could not have been predicted beforehand from the known activity of the individual ingredients comprising the mixture. Accordingly, it is therefore possible to produce a more effective slime-control agent than has previously been available. Because of the enhanced activity of the mixture, the total quantity of biocide required for an effective treatment may be reduced. In addition, the high degree of biocidal effectiveness which is provided by each of the ingredients may be exploited without use of the higher concentrations of each. This feature is not only important and advantageous from an economical point of view, but also most desirable from the pollution or ecological standpoints. In this regard, it might be pointed out that the smaller the amount of a chemical that is required for effective treatment, the smaller the problem in treating the wastes from these systems. In both cooling water systems and in paper and pulp mill systems, certain discharge of waste water, e.g., blowdown in cooling water systems, is a necessity. However, because of the current concern and legislation regarding the discharge of wastes, the effluent waste water must be treated to reduce and, hopefully, to eliminate any undesirable constituents. This treatment, of course, is time consuming and costly. Accordingly, a reduction in additive usage will result in a corresponding reduction in costs for the treatment of wastes containing these additives.

To demonstrate the synergism which is obtainable from the combination of the phenolic compounds with the 5-chloro-4-phenyl-1,2-dithiole-3-one (supplied by Hercules Corporation under designation S-1612), various exemplary phenolic compounds were chosen. As earlier indicated, synergistic activity can be obtained by combining the dithiole-3-one compound with phenolic compounds which exhibit growth inhibitory or biocidal activity with respect to bacteria, fungi and/or algae. The phenolic compounds which were chosen as representative are as follows: phenol, orthophenylphenol (Dow Chemical Dowicide 1); 2-chloro-4-phenylphenol (Dowicide 4); 2, 3, 4, 6-tetrachlorophenol (Dowicide 6); and 4-chloro-2-cyclopentylphenol.

In order to illustrate the synergistic activity, the efficacy and the comparative effectiveness of the inventive compositions, various tests were utilized and will be described following.

growth was determined by turbidity or clarity respectively in the medium. End points for the various mixtures were then compared with end points for the pure active ingredients working alone in concomitantly prepared culture bottles. Synergism was determined by the method described by Kull et al., [F. C. Kull, P. C. Eisman, H. D. Sylwestrowicz and R. L. Mayer, Applied Microbiology, 9, 538–41, (1961)]and the relationships, $Q_A/Q_a + Q_B/Q_b = 1$ is additivity
$> 1$ is antagonism
$< 1$ is synergism where, $Q_a$ = Quantity of Compound A producing an end point (minimum inhibitory concentration)
$Q_b$ = Quantity of Compound B producing an end point (minimum inhibitory concentration)
$Q_A$ = Quantity of Compound A (in the mixture) producing an end point
$Q_B$ = Quantity of Compound B (in the mixture) producing an end point For mixtures of Compounds A and B, and for Compound A and Compound B acting alone, the following results were observed:

TABLE 1

| Weight Ratio of A to B | Quantities Producing End Points (ppm) | | | $Q_A/Q_a$ | $Q_B/Q_b$ | $\frac{Q_A + Q_B}{Q_a \quad Q_b}$ |
|---|---|---|---|---|---|---|
| | $Q_A$ | $Q_B$ | Mixture | | | |
| 100/0 | 14 ($Q_a$) | — | — | | | |
| 95/5 | 10.45 | 0.55 | 11.0 | 0.747 | 0.0003 | 0.75 |
| 50/50 | 10.0 | 10.0 | 20.0 | 0.714 | 0.005 | 0.72 |
| 5/95 | 9.0 | 171 | 180 | 0.643 | 0.086 | 0.73 |
| 0/100 | — | 2000($Q_b$) | — | | | |

SPECIFIC EMBODIMENTS

EXAMPLE 1

SYNERGISTIC COMBINATION:

Compound A: 5-chloro-4-phenyl-1,2-dithiole-3-one
Compound B: Phenol

The compositions of this Example contained 5-chloro-4-phenyl-1,2dithiole-3-one (referred to as Compound A in the Test Equations and in Tables 1 through 1C ) and phenol (referred to as Compound B in this Example and in the Test Equations and in Tables 1 through 1C) in the weight ratios expressed in the Tables which follow. The compositions were tested for synergistic activity in accordance with the method described. The synergism test was utilized to evaluate each of the combinations of this Example and the following Examples.

Synergistic Index Test

Synergistic activity was demonstrated by ading Compound A and Compound B in varying ratios and over a range of concentrations to liquid nutrient medium which was subsequently inoculated with a standard volume of suspension of the bacterium Aerobacter aerogenes. Following 2 days' incubation, the lowest concentration of each ratio which prevented growth of the bacteria was taken as the end point. Growth or no- It is evident from the data recorded in Table 1 that compositions of the present invention function to control slime growth due to microorganisms not only at equal portions of the respective ingredients, but also where just minor amounts of one or the other are present. This discovery of synergism at the lower levels is extremely valuable since it illustrates conclusively that the ingredients are compatible over the wide percentage by weight range.

BACTERICIDAL EFFECTIVENESS

The bactericidal effectiveness of the mixture of Compound A and Compound B of this Example is demonstrated by the following Table in which the inhibiting power of a 50/50 by weight mixture of A and B is shown. *Aerobacter aerogenes* was employed as the test organism and a substrate technique was utilized. Specifically, the biocidal mixture was added in gradually increasing quantities to nutrient agar media which was then inoculated with *A. aerogenes*. The preparation was then incubated for 48 hours. The values set forth in the Table indicate the quantity of biocide required, in parts by weight for each one million parts by weight of the medium, in order to achieve complete inhibition of the growth of the test organism.

TABLE 1A

| Biocidal Material | Quantity (ppm) required for inhibition of *A. aerogenes* |
|---|---|
| Compound A (5%), Compound B (5%), Inert (90%) | 300 |

FUNGICIDAL EFFECTIVENESS

In order to test the effectiveness of the inventive mixtures in respect to fungi, evaluations were made following the procedures described by B. F. Shema and J. H. Conkey [Journal for the Technical Association of The Pulp and Paper Industry, 36, 20A–30A, (1953)]. The described procedure generally entails incorporating the biocide under test in a nutrient substrate such as agar, malt, etc. and pouring the resulting medium into a Petri dish and allowing the medium to solidify. A button of fungus inoculum is placed on the surface of the solidified medium and the medium is incubated for a period of 14 days. After the period, the diameter of the colony is measured and compared with the diameter of the button of inoculum originally placed upon the surface. If there is no increase in the diameter, the growth of the fungus is considered to be completely inhibited and the treatment level which accomplished this is considered the inhibitory concentration. The fungal species utilized as the test microorganism to evaluate the efficacy of the present mixture were *Penicillium expansum* and *Aspergillus niger*.

TABLE 1B

| Biocidal Material | Quantity (ppm) for inhibition | |
| --- | --- | --- |
| | P. expansum | A. niger |
| Compound A (5%), Compound B (5%), Inert (90%) | 100 | 100 | concentrations of biocide and two portions are left untreated to serve as controls. The control portions are plated for total count at the beginning of biocide treatment and all portions are plated for total count at some suitable time period(s) after beginning biocide treatment. Using the counts obtained from the plating, the percentage kill (based on the initial control count) may be calculated. In this evaluation the water sample was taken from a water tray of a paper machine located in the northeastern United States.

For the purposes of comparison, the mixture of A and B was evaluated together with two recognized commercial biocides, Pentachlorophenol and a Commercial Product.

A perusal of the recorded percentages clearly establishes that the composition of the present invention, although less concentrated with respect to active ingredients as compared to the two commercial products, gave excellent rates of kill even at low treatment levels. As earlier expressed, excellent performance of a biocidal composition at low treatment levels not only provides a most desirable cost performance index, but also provides most desirable advantages from the aspects of pollution abatement, waste treatment costs and the preservation of the ecological strain.

TABLE 1C

| Biocidal Material | | | Quantity of biocide (ppm) | Percent kill after 6 hours |
| --- | --- | --- | --- | --- |
| Compound A (5%), | Compound B (5%), | Inert (90%) | 5 | 77 |
| do. | do. | do. | 10 | 89 |
| do. | do | do. | 25 | 94 |
| do. | do. | do. | 50 | 99 |
| do. | do. | do. | 100 | 100 |
| Pentachlorophenol (100%) | | | 5 | 82 |
| do. | | | 10 | 91 |
| do. | | | 25 | 100 |
| do. | | | 50 | 100 |
| do. | | | 100 | 100 |
| Commercial Product | (30% active: Combination of dithiocarbamates) | | 5 | 72 |
| do. | do. | | 10 | 72 |
| do. | do. | | 25 | 73 |
| do. | do. | | 50 | 78 |
| do. | do. | | 100 | 88 |

SLIME CONTROL EFFECTIVENESS

The inventive methods and compositions were also tested with respect to their performance in the control of slime formation in industrial systems. In this test an industrial recirculating water was obtained from a system which was currently experiencing problems in respect to the formation of slime by microorganisms. Such tests do not demonstrate the efficiency of the biocide employed with respect to specific species of microorganisms but instead supply a practical demonstration of the efficacy of the biocide tested in relation to those communities of microorganisms which have evidenced their ability to form slime in actual industrial systems.

In the testing of recirculating water samples, a substrate evaluation was employed. In such testing identical portions of water samples are treated with varying

EXAMPLE 2
SYNERGISTIC COMBINATION

Compound A: 5-chloro-4-phenyl-1,2-dithiole-3-one
Compound B: Ortho-phenylphenol

The compositions of this Example contained 5-chloro-4-phenyl-1,2-dithiole-3-one (referred to as Compound A in the Test Equations and in Tables 2 through 2C) and ortho-phenylphenol (referred to as Compound B in this Example). The compositions of this Example were tested in accordance with the test procedures outlined in Example 1. The data ascertained for the respective tests are recorded below under the commensurate Table.

Synergistic Index Test

For mixtures of Compounds A and B, and for Compound A and Compound B acting alone, the following results were observed:

TABLE 2

| Weight Ratio of A to B | Quantities Producing End Points (ppm) | | | $Q_A/Q_a$ | $Q_B/Q_b$ | $\dfrac{Q_A+Q_B}{Q_a\ \ Q_b}$ |
|---|---|---|---|---|---|---|
| | $Q_A$ | $Q_B$ | Mixture | | | |
| 100/0 | 11.0 | — | — | | | |
| 95/5 | 9.5 | 0.5 | 10.0 | 0.864 | 0.004 | 0.87 |
| 50/50 | 6.0 | 6.0 | 12.0 | 0.546 | 0.048 | 0.59 |
| 5/95 | 3.0 | 57.0 | 60.0 | 0.273 | 0.456 | 0.73 |
| 0/100 | — | 125 | — | | | |

The above evaluation established that the compositions in the weight ratios evaluated all exhibited synergistic activity. As set forth in the explanation of the test earlier in this text, when $Q_A/Q_a + Q_B/Q_b$ is less than 1, then the two individual components are acting in a synergistic manner.

BACTERICIDAL EFFECTIVENESS

The bactericidal effectiveness of the combination of this Example was tested in accordance with the procedure outlined in Example 1. The values obtained are recorded in Table 2A which follows:

TABLE 2A

| Biocidal Material | Quantity (ppm) required for inhibition of *A. aerogenes* |
|---|---|
| Compound A (5%), Compound B (5%), Inert (90%) | 300 |

SLIME CONTROL EFFECTIVENESS

The test procedure used was that explained in Example 1. For comparative purposes, two commercial products was tested together with the composition of this Example. The water sample in this test was taken from the air-washer sump of an industrial plant located in the northeastern United States.

The results obtained for the inventive composition were comparable pentachlorophenol the perntachlorophenol at high treatment dosage and were overall superior to the Commercial Product which has found widespread acceptance and use. Moreover, when the low concentrations of the active ingredients are considered, it is obvious that the inventive composition was quite active in kill percentage.

TABLE 2C

| Biocidal Material | | | Quantity of biocide (ppm) | Percent kill after 6 hours |
|---|---|---|---|---|
| Compound A (5%), | Compound B (5%), | Inert (90%) | 5 | 0 |
| do. | do. | do. | 10 | 12 |
| do. | do. | do. | 25 | 35 |
| do. | do. | do. | 50 | 95 |
| do. | do. | do. | 100 | 100 |
| Pentachlorophenol (100%) | | | 5 | 41 |
| do. | | | 10 | 59 |
| do. | | | 25 | 87 |
| do. | | | 50 | 100 |
| do. | | | 100 | 100 |
| Commercial Product | (30% active - See Table 1C) | | 5 | 0 |
| do. | | do. | 10 | 0 |
| do. | | do. | 25 | 0 |
| do. | | do. | 50 | 18 |
| do. | | do. | 100 | 28 |

The above data established that the combination effectively inhibited the growth of the particular bacterial strain.

FUNGICIDAL EFFECTIVENESS

The effectiveness of the composition of Example 2 was tested in accordance with the procedures set forth in Example 1. The results were:

Table 2B

| Biocidal Material | Quantity (ppm) for inhibition | |
|---|---|---|
| | *P. expansum* | *A. niger* |
| Compound A (5%), Compound B (5%), Inert (90%) | 500 | 500 |

The composition was quite effective in controlling fungus growth when it is considered that it contained only 10 percent active material.

EXAMPLE 3

SYNERGISTIC COMBINATION

Compound A: 5-chloro-4-phenyl-1,2-dithiole-3-one
Compound B: 2-chloro-4-phenylphenol The combination of this Example contained 5-chloro-4-phenyl-1,2-dithiole-3-one (hereafter referred to as Compound A) and 2-chloro-4-phenylphenol (referred to in this Example as Compound B). As with the previous Examples, combinations of these ingredients were tested in accordance with the various test procedures outlined in Example 1. The data obtained is recorded in the follwing Tables 3 through 3C.

Synergistic Index Test

For mixtures of Compounds A and B, and for Compound A and Compound B acting alone, the following results were observed:

As with the previous Examples, the composition was compared with commercially available products using samples of water derived from the sump of an airwasher of an industrial cooling water system located in the northeastern United States.

Again, the slime control effectiveness of the instant composition even at only 3 hour contact times was su-

TABLE 3

| Weight Ratio of A to B | Quantities Producing End Points (ppm) | | | $Q_A/Q_a$ | $Q_B/Q_b$ | $\frac{Q_A+Q_B}{Q_a \quad Q_b}$ |
|---|---|---|---|---|---|---|
| | $Q_A$ | $Q_B$ | Mixture | | | |
| 100/0 | 16.0 | — | — | | | |
| 95/5 | 15.2 | 0.8 | 16.0 | 0.950 | 0.027 | 0.98 |
| 50/50 | 7.0 | 7.0 | 14.0 | 0.438 | 0.233 | 0.67 |
| 5/95 | 1.0 | 19.0 | 20.0 | 0.063 | 0.633 | 0.70 |
| 0/100 | — | 30.0 | — | | | |

The results obtained for this particular combination established unequivocally that the two ingredients behave synergistically together.

BACTERICIDAL EFFECTIVENESS

The test procedure as described in Example 1 was utilized. The results established that the composition was effective in controlling this strain of bacteria.

perior to the commercial products at low treatment ranges and was significantly better overall as compared to the 30 percent active Commercial Product.

EXAMPLE 4

SYNERGISTIC COMBINATION

Compound A: 5-chloro-4-phenyl-1,2-dithiole-3-one
Compound B: 2,3,4,6-tetrachlorophenol

TABLE 3A

| Biocidal Material | Quantity (ppm) required for inhibition of *A. aerogenes* |
|---|---|
| Compound A (5%), Compound B (5%), Inert (90%) | 300 |

FUNGICIDAL EFFECTIVENESS

The fungicidal activity of the composition of this Example was tested in accordance with the procedure previously described. The results were:

Synergistic Index Test

The synergistic activity of the combinations of 5-chloro-4-phenyl-1,2-dithiole-3-one (referred to as Compound A) and 2,3,4,6-tetrachlorophenol (referred to in this Example as Compound B) was evaluated in

TABLE 3B

| Biocidal Material | Quantity (ppm) for inhibition | |
|---|---|---|
| | *P. expansum* | *A. niger* |
| Compound A (5%), Compound B (5%), Inert (90%) | 500 | 500 |

SLIME CONTROL EFFECTIVENESS

The slime control effectiveness of the present composition was evaluated using actual paper mill water as explained under the procedure outlined in Example 1.

accordance with the test described. The results were as follows:

For mixtures of Compounds A and B, and for Compound A and Compound B acting alone, the following results were observed:

TABLE 3C

| Biocidal Material | | | Quantity of biocide (ppm) | Percent kill after 3 hours |
|---|---|---|---|---|
| Compound A (5%), | Compound B (5%), | Inert (90%) | 5 | 5 |
| do. | do. | do. | 10 | 63 |
| do. | do. | do. | 25 | 76 |
| do. | do. | do. | 50 | 100 |
| do. | do. | do. | 100 | 100 |
| Pentachlorophenol (100%) | | | 5 | 4 |
| do. | | | 10 | 24 |
| do. | | | 25 | 71 |
| do. | | | 50 | 98 |
| do. | | | 100 | 100 |
| Commercial Product | (30% active - See Table 1C) | | 5 | 0 |
| do. | do. | | 10 | 0 |
| do. | do. | | 25 | 5 |
| do. | do. | | 50 | 19 |
| do. | do. | | 100 | 23 |

TABLE 4

| | Weight Ratio of A to B | Quantities Producing End Points (ppm) | | | $Q_A/Q_a$ | $Q_B/Q_b$ | $\frac{Q_A+Q_B}{Q_a \quad Q_b}$ |
|---|---|---|---|---|---|---|---|
| | | $Q_A$ | $Q_B$ | Mixture | | | |
| Trial (1) | 100/0 | 18.0 | — | — | | | |
| | 50/50 | 14.0 | 14.0 | 28.0 | 0.778 | 0.047 | 0.83 |
| | 5/95 | 4.0 | 76.0 | 80.0 | 0.222 | 0.253 | 0.47 |
| | 0/100 | — | 300 | — | | | |
| Trial (2) | 100/0 | 5.0 | — | — | | | |
| | 60/40 | 4.8 | 3.2 | 8.0 | 0.960 | 0.011 | 0.97 |
| | 0/100 | — | 300 | — | | | |

The combinations exhibited a QA/QA + QB/QB of less than 1 which, of course, established that the individual ingredients operated in concert to produce a synergistic result.

BACTERICIDAL EFFECTIVENESS

The efficacy of the compositions of this Example was tested in accordance with the procedure outlined earlier. The results of the test clearly established that the combination of the instant invention is effective even at low percentages of active ingredients.

TABLE 4A

| Biocidal Material | Quantity (ppm) required for inhibition of *A. aerogenes* |
|---|---|
| Compound A (5%), Compound B (5%), Inert (90%) | 300 |

FUNGICIDAL EFFECTIVENESS

The fungicidal activity of the composition of this Example was tested in accordance with the procedure previously described. The result of this evaluation was as follows:

TABLE 4B

| Biocidal Material | Quantity (ppm) for inhibition | |
|---|---|---|
| | *P. expansum* | *A. niger* |
| Compound A (5%), Compound B (5%), Inert (90%) | 100 | 500 |

SLIME CONTROL EFFECTIVENESS

As in the previous Examples and in the manner set forth in the previous Examples, the slime control effectiveness of the composition of Example was tested. The outcome of this evaluation and the data derived using the Commercial Products are set forth in the following Table. The water sample used in this test was obtained from the airwasher sump of a cooling tower located in the northeastern United States.

The composition of this Example, as with the previous Examples, exhibited overall desriable and attractive slime control capacity. Of special interest is the fact that at low percentage active concentrations the compositions were capable of controlling the slime-forming organisms.

EXAMPLE 5
SYNERGISTIC COMBINATION

Compound A: 5-chloro-4-phenyl-1,2-dithiole-3-one
Compound B: 4-chloro-2-cyclopentylphenol
Synergistic Index Test The synergistic activity of the combinations of 5-chloro-4-phenyl-1,2-dithiole-3-one (referred to as Compound A) and 4-chloro-2-cyclopentylphenol (referred to in this Example as Compound B) was evaluated in accordance with the test described. The results were as follows:

For mixtures of Compounds A and B, and for Compound A and Compound B acting alone, the following results were observed:

TABLE 4C

| Biocidal Material | | | Quantity of biocide (ppm) | Percent kill after 6 hours |
|---|---|---|---|---|
| Compound A (5%), | Compound B (5%), | Inert (90%) | 5 | 35 |
| do. | do. | do. | 10 | 45 |
| do. | do. | do. | 25 | 64 |
| do. | do. | do. | 50 | 85 |
| do. | do. | do. | 100 | 100 |
| Pentachlorophenol (100%) | | | 5 | 41 |
| do. | | | 10 | 59 |
| do. | | | 25 | 87 |
| do. | | | 50 | 100 |
| do. | | | 100 | 100 |
| Commercial Product | (30% active - See Table 1C) | | 5 | 0 |
| do. | do. | | 10 | 0 |
| do. | do. | | 25 | 0 |
| do. | do. | | 50 | 18 |
| do. | do. | | 100 | 28 |

TABLE 5

| Weight Ratio of A to B | Quantities Producing End Points (ppm) | | | $Q_A/Q_a$ | $Q_B/Q_b$ | $\frac{Q_A+Q_B}{Q_a\ Q_b}$ |
|---|---|---|---|---|---|---|
| | $Q_A$ | $Q_B$ | Mixture | | | |
| 100/0 | 3.0 | — | — | | | |
| 95/5 | 2.37 | 0.125 | 2.5 | 0.790 | 0.003 | 0.79 |
| 50/50 | 1.75 | 1.75 | 3.5 | 0.583 | 0.035 | 0.62 |
| 5/95 | 1.0 | 19.0 | 20.0 | 0.333 | 0.380 | 0.71 |
| 0/100 | — | 50.0 | — | | | |

All of the combinations tested exhibited a QA/Qa +QB/Qb of less than 1 which, of course, established that the individual ingredients operated in concert to produce a synergistic result

BACTERICIDAL EFFECTIVENESS

The efficacy of the compositions of this Example was tested in accordance with the procedure outline earlier. The results of the test clearly established that the combination of the instant invention is effective even at low percentages of active ingredients.

TABLE 5A

| Biocidal Material | Quantity (ppm) required for inhibition of A. aerogenes |
|---|---|
| Compound A (5%), Compound B (5%), Inert (90%) | 300 |

FUNGICIDAL EFFECTIVENESS

The fungicidal activity of the composition of this Example was tested in accordance with the procedure previously described. The result of this evaluation was as follows:

TABLE 5B

| Biocidal Material | Quantity (ppm) for inhibition | |
|---|---|---|
| | P. expansum | A. niger |
| Compound A (5%), Compound B (5%), Inert (90%) | 500 | 500 |

SLIME CONTROL EFFECTIVENESS

As in the previous Examples and in the manner set forth in the previous Examples, the slime control effectiveness of the composition of the Example was tested. The outcome of this evaluation and the data derived using the commerical products are set forth in the following Table. The water sample used in this test was obtained from the water tray of a paper machine of a mill located in the northeastern United States.

cial interest is the fact that at low percentage active concentrations the compositions were capable of controlling the slime-forming organisms.

When the inventive compositions are employed in the treatment of cooling or paper mill water, they are preferably utilized in the form of relatively dilute solutions or dispersions. For example, a preferred solution comprises between 5 percent to 65 percent by weight of the synergistic combination in admixture with various solvents and solubilizing agents. An example of such a synergistic biocidal product comprises from about 5 to 10 percent by weight of the phenol, from about 5 to 10 percent by weight of the 5-chloro-4-phenyl-1,2-dithiole-3-one and the remainder composed of such materials as surfactants, stabilizers, organic solvents, such as alkanols, aromatic hydrocarbons and/or water.

TABLE 5C

| Biocidal Material | | | Quantity of biocide (ppm) | Percent kill after 3 hours |
|---|---|---|---|---|
| Compound A (5%), | Compound B (5%), | Inert (90%) | 5 | 38 |
| do. | do. | do. | 10 | 84 |
| do. | do. | do. | 25 | 86 |
| do. | do. | do. | 50 | 92 |
| do. | do. | do. | 100 | 95 |
| Pentachlorophenol (100%) | | | 5 | 89 |
| do. | | | 10 | 94 |
| do. | | | 25 | 100 |
| do. | | | 50 | 100 |
| do. | | | 100 | 100 |
| Commercial Product | (30% active - See Table 1C) | | 5 | 38 |
| do. | do. | | 10 | 36 |
| do. | do. | | 25 | 9 |
| do. | do. | | 50 | 0 |
| do. | do. | | 100 | 36 |

The composition of this Example exhibited overall desirable and attractive slime control capacity. Of spesurfactants such as the alkylaryl polyether alcohols, polyether alcohols, sulfonates and sulfates, and the like, may be employed to enhance the dispersibility and stability of these dispersions. The foregoing solutions of the biocidal compositions are utilized in order to insure the rapid and uniform dispersibility of the biocides within the industrial water which is treated. It has been found that either aqueous or non-aqueous solvents are generally suitable in the preparation of compositions of the invention, e.g., methyl cellosolve, organic solvents, such as the aliphatic and aromatic hydrocarbons, e.g., kerosene. Based upon the synergism study as outlined above, it was ascertained that in the treatment of paper mill and cooling water, effecive biocidal actions is obtained when the concentration or treatment level of the combination or admixture of biocides is between 0.5 parts per million to 1,000 parts per million, and preferably between 1 and 100 parts per million, based upon the total content of the aqueous system treated, such as the total quantity of cooling water or paper mill water.

The compositions may also be utilized for the preservation of slurries and emulsions containing carbohydrates, proteins, fats, oils, etc.; dosage levels for this purpose range in the vicinity of 0.01 to 5 percent. The compositions of the invention which can be prepared by merely combining the respective ingredients and mixing thoroughly at standard conditions may be fed continuously to the treated system, e.g., by means of a metered pump, or may be fed periodically at predetermined intervals calculated to control the growth of slime-forming organisms in the system. Naturally, in the treatment of cooling water, the feeding of the inventive compositions must be designed to compensate for blowdown in those systems which employ that expedient.

Although the foregoing has been specifically directed to liquid formulations, the combinations of the invention may, of course, be formulated dry with well-known pelletizing agents, e.g, sodium chloride, talc, aluminate, etc. to produce solid pellets or briquettes which are added directly to the systems to be treated. The pellets or briquettes, of course, dissolve in accordance with predetermined conditions or rates.

In describing the inventive subject matter, the expression "composition" has been utilized. However, it is to be understood that physical compositions or combinations are not the sole utility of the invention. If, for example, the separate ingredients of the "composition" are added independently to a particular system, it is intended that this usage of the subject matter is within the scope of the invention and is to be construed within the broad interpretation of "composition" and/or "combination."

As would be expected, the inventive composition may be added to the cooling water or paper and pulp mill systems at any convenient point. Naturally, in once-through or non-circulating systems, the composition must be added upstream from the point or points at which microorganism control is desired. In circulating systems or pulp and paper systems, the compositions must be added at any point provided that the time lapse and the conditons experienced between point of addition and the point at which the effect of the composition is to be experienced are not so drastic as to result in the neutralization of the effect of the composition.

Although the invention has been described specifically as being directed to specific compositions comprising 5-chloro-4-phenyl-1,2-dithiole-3-one in combination with the phenol as described in Example 1, the phenylphenol of Example 2, the 2-chlorophenylphenol of Example 3, the chloropehnol of Example 4 or the pentylphenol of Example 5, it is obvious that homologues, analogues, etc. of the dithiole-3-one compound certainly are operable for the purpose. Likewise, the derivatives of the specially exemplifed organo-bromine compounds also have utility in the present inventive concept. Moreover, as eariler described, mixtures of the various organo-bromine compounds would also serve the purpose. the provision, of course, is that the organo-bromine compound possesses biocidal or growth inhibitory capacity with respect to bacteria, fungi, and algae.

It should be noted that while the evidence has been derived from the treatemnt of samples taken from paper and pulp mill aqueous systems, the compositions and methods of the present invention are broadly applicable to the treatemnt of aesthetic waters as well as industrial waters such as cooling waters which are plagued by deposits formed by slime-forming organisms, or by the very presence such organisms.

Having thus described the invention, what we claim is:

1. A method for controlling the growth of the microorganism Aerobacter Aerogenes in an aqueous system in which said microorganism is found which comprises adding to said system so as to contact said microorganism an effective amount of a combination comprising 5-chloro-4-phenyl-1,2-dithiole-3-one and phenol, where the weight ratio of the dithiole to the phenol is from 5 percent to 95 percent to 95 percent to 5 percent.

2. The method of claim 1 where said weight ratio is 50 percent to 50 percent.

3. The method of claim 1 where said combination is added to said system in an amount of from 0.5 to about 1,000 parts by weight of said combination per million parts by weight of said aqueous system.

4. A composition which is effective in controlling the growth of the microorganism Aerobacter Aerogenes in aqueous microorganism system where said is found which comprises 5 chloro-4phenyl-1,2-dithiole-3one phenol, wherein the weight ratio of the dithiole to the phenol is from about 5 percent to 95 percent to 95 percent to 5 percent.

5. The composition of claim 4 wherein said weight ratio is 50 percent to 50 percent.

* * * * *